United States Patent
Patil et al.

(10) Patent No.: US 11,535,789 B1
(45) Date of Patent: Dec. 27, 2022

(54) METHODS OF MAKING AND USING A HIGH TEMPERATURE CEMENTITIOUS COMPOSITION

(71) Applicant: Halliburton Energy Services, Inc., Houston, TX (US)

(72) Inventors: Sandip Prabhakar Patil, Pune (IN); Samuel J. Lewis, Houston, TX (US); Ganesh Shriniwas Pangu, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/383,652

(22) Filed: Jul. 23, 2021

(51) Int. Cl.
*C09K 8/48* (2006.01)
*C04B 14/10* (2006.01)
*C04B 24/28* (2006.01)
*C04B 28/02* (2006.01)

(52) U.S. Cl.
CPC ............... *C09K 8/48* (2013.01); *C04B 14/10* (2013.01); *C04B 24/287* (2013.01); *C04B 28/02* (2013.01)

(58) Field of Classification Search
CPC ......... C09K 8/48; C04B 14/10; C04B 24/287; C04B 28/02
See application file for complete search history.

(56) References Cited

U.S. PATENT DOCUMENTS

| | | | |
|---|---|---|---|
| 6,180,689 B1 * | 1/2001 | Moulin | C04B 24/2652 |
| | | | 525/61 |
| 9,410,069 B2 | 8/2016 | Zha et al. | |
| 2007/0261849 A1 | 11/2007 | Valenziano et al. | |
| 2008/0135247 A1 * | 6/2008 | Hutchins | C09K 8/882 |
| | | | 166/308.2 |
| 2013/0324443 A1 | 12/2013 | Wang et al. | |
| 2015/0368538 A1 | 12/2015 | Wang et al. | |
| 2017/0002257 A1 | 1/2017 | Pisklak et al. | |

FOREIGN PATENT DOCUMENTS

| | | | |
|---|---|---|---|
| WO | 2016105331 A1 | 6/2016 | |
| WO | 2021021101 A1 | 2/2021 | |
| WO | WO-2021021101 A1 * | 2/2021 | ............... C09K 8/50 |

OTHER PUBLICATIONS

Electronic Acknowledgment Receipt, Specification and Drawings for International Application No. PCT/US2021/043166, entitled "Methods of Making and Using a High temperature Cementitious Composition," filed July 26, 2021, 47 pages.

Galindo, Kay A. et al., "High Temperature, High Performance Water-Based Drilling Fluid for Extreme High Temperature Wells," SPE International Symposium on Oilfield Chemistry, Apr. 2015, SPE-173773-MS, 9 pages, Society of Petroleum Engineers.

Foreign Communication from Related Application—International Search Report and Written Opinion of the International Searching Authority, International Application No. PCT/US2021/043166, dated Jul. 26, 2021, 10 pages.

* cited by examiner

*Primary Examiner* — Crystal J. Lee
(74) *Attorney, Agent, or Firm* — Conley Rose, P.C.; Rodney B. Carroll

(57) ABSTRACT

A method of servicing a wellbore penetrating a subterranean formation, comprising placing into the wellbore a cementitious composition comprising a crosslinked polymeric microgel, a clay, a cementitious material, and water. By incorporating the crosslinked polymeric microgel and the clay as disclosed herein, the cementitious composition can be used at relatively high temperatures.

20 Claims, 1 Drawing Sheet

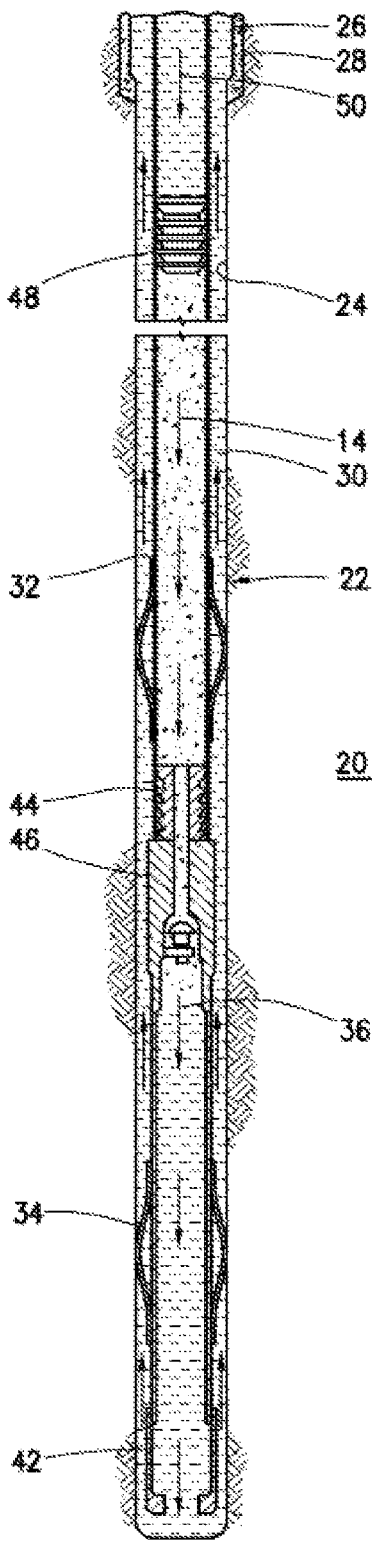

METHODS OF MAKING AND USING A HIGH TEMPERATURE CEMENTITIOUS COMPOSITION

FIELD

This application relates to the recovery of natural resources from a wellbore penetrating a subterranean formation, and more specifically this application relates to high temperature cementitious compositions.

BACKGROUND

This disclosure relates generally to methods of servicing a wellbore. More specifically, it relates to methods of treating a wellbore penetrating a subterranean formation, for example during a cementing operation.

Natural resources such as gas, oil, and water residing in a subterranean formation are usually recovered by drilling a wellbore down to the subterranean formation while circulating a drilling fluid, also referred to as drilling mud, in the wellbore. After terminating circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed. One example of a secondary cementing operation is squeeze cementing whereby a cement slurry is employed to plug and seal off undesirable flow passages in the cement sheath and/or the casing.

While cement slurries have been developed heretofore, challenges continue to exist with the successful use of cement slurries in subterranean cementing operations. In some wellbores, elevated temperatures (e.g., 450° F.) can alter cement properties, such as rheology, yield point, suspension property, and plastic viscosity. Such alterations may render the cement slurry becoming unsuitable for its intended purpose. Therefore, an ongoing need exists for a cement slurry that is suitable for use at high temperatures, thus can be used under broader conditions.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

The FIGURE is a depiction of the placement of a cementitious composition into a wellbore annulus in accordance with some embodiments of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

It is to be understood that "subterranean formation" encompasses both areas below exposed earth and areas below earth covered by water such as ocean or fresh water. Herein in the disclosure, "top" means the well at the surface (e.g., at the wellhead which may be located on dry land or below water, e.g., a subsea wellhead), and the direction along a wellbore towards the well surface is referred to as "up"; "bottom" means the end of the wellbore away from the surface, and the direction along a wellbore away from the wellbore surface is referred to as "down." For example, in a horizontal wellbore, two locations may be at the same level (i.e., depth within a subterranean formation), the location closer to the well surface (by comparing the lengths along the wellbore from the wellbore surface to the locations) is referred to as "above" the other location, the location farther away from the well surface (by comparing the lengths along the wellbore from the wellbore surface to the locations) is referred to as "below" or "lower than" the other location.

Disclosed herein is a method of servicing a wellbore penetrating a subterranean formation with a cementitious composition. In embodiments, the method comprises placing a cementitious composition into the wellbore. The cementitious composition can comprise a crosslinked polymeric microgel, a clay, a cementitious material, and water.

In embodiments, the cementitious composition comprises a crosslinked polymeric microgel. A "crosslinked polymeric microgel" herein refers to a colloidal dispersion of gel-state particles comprising chemically cross-linked three-dimensional polymer networks that can be swollen in a suitable solvent. Depending on the polymeric material, a crosslinked polymeric microgel may be able to swell or shrink in response to a variety of external stimuli, such as temperature, pH, ionic strength, and electric field. The crosslinked polymeric microgel can be a crosslinked polymer. The crosslinked polymeric microgel can be provided in the form of a dry powder or in the form of a water-in-oil emulsion. In the case of a water-in-oil emulsion, the crosslinked polymeric microgel can be dispersed in a continuous oil phase and the mixture included in a cementitious composition for use in servicing a wellbore.

In embodiments, the crosslinked polymeric microgel comprises monomer units. The monomer units can occur in any configuration in the crosslinked polymeric microgel and can be repeated with any frequency. The monomer units can be selected from vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutraldchydc glutaraldehyde, acryloylmorpholine, and any combination thereof.

In some embodiments, the crosslinked polymeric microgel is a terpolymer. For example, the crosslinked polymeric microgel is a terpolymer comprising monomer units of vinyl pyrrolidone, 2-acrylamido-2-methyl propane sulfonic acid (AMPS), and acrylamide. In the crosslinked polymeric microgel, vinyl pyrrolidone monomer units can be in an amount of from about 5 mole percent (mol %) to about 30 mol % based on the total moles of monomer units in a molecule of the crosslinked polymeric microgel, alternatively from about 5 mol % to about 25 mol %, alternatively from about 5 mol % to about 20 mol %, or alternatively from about 10 mol % to about 20 mol %. AMPS monomer units can be in the crosslinked polymeric microgel in an amount of from about 40 mol % to about 90 mol % based on the total moles of monomer units in a molecule of the crosslinked polymeric microgel, alternatively from about 40 mol % to about 80 mol %, alternatively from about 45 mol % to about 80 mol %, alternatively from about 50 mol % to about 80 mol %, or alternatively from about 50 mol % to about 75 mol %. Acrylamide monomer units can be in the crosslinked polymeric microgel in an amount of from about 5 mol % to about 50 mol % based on the total moles of monomer units in a molecule of the crosslinked polymeric microgel, alternatively from about 5 mol % to about 45 mol %, alternatively from about 10 mol % to about 45 mol %, alternatively from about 15 mol % to about 45 mol %, or alternatively from about 15 mol % to about 40 mol %.

In embodiments, the molar ratio of the AMPS monomer units to the vinyl pyrrolidone monomer units in the crosslinked polymeric microgel is from about 10 to about 0.1, alternatively from about 10 to about 0.5, alternatively from about 8 to about 0.5, alternatively from about 8 to about 1, or alternatively from about 5 to about 1. The molar ratio of the acrylamide monomer units to the vinyl pyrrolidone monomer units in the crosslinked polymeric microgel can be from about 10 to about 0.1, alternatively from about 10 to about 0.5, alternatively from about 8 to about 0.5, alternatively from about 8 to about 1, or alternatively from about 5 to about 1.

In embodiments, the crosslinked polymeric microgel is present in the cementitious composition in an amount of from about 0.1 lb/bbl to about 5 lb/bbl based on the total volume of the cementitious composition, alternatively from about 0.1 lb/bbl to about 4 lb/bbl, alternatively from about 0.1 lb/bbl to about 3 lb/bbl.

In embodiments, the weight ratio of the crosslinked polymeric microgel to the cementitious material in the cementitious composition is from about 0.5 to about 0.01, alternatively from about 0.4 to about 0.01, alternatively from about 0.4 to about 0.1, or alternatively from about 0.4 to about 0.1.

A crosslinked polymeric microgel of the type disclosed herein can be prepared using any suitable methodology. In embodiments, the crosslinked polymeric microgel may be prepared by the polymerization of one or more monomers and/or crosslinkers selected from the group consisting of vinyl pyrrolidone, 2-acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutaraldehyde, acryloylmorpholine, and any combination thereof. A "crosslinker" is defined herein as comprising two or more olefinic bonds. In some embodiments, the crosslinkers comprise methylenebisacrylamide, pentaerythritol allyl ether, or a combination thereof. The pentaerythritol allyl ether can have any suitable number of allyl groups per molecule, such as about 1 to 4, 1 to 3, 2 to 4, about 3, or about 1 or less, about 1.5, 2, 2.5, 3, 3.5, or about 4. In some embodiments, the crosslinked polymeric microgel is a terpolymer and the one or more monomers and/or crosslinkers are vinyl pyrrolidone, 2-acrylamido-2-methyl propane sulfonic acid (AMPS), and acrylamide.

The polymerization of the one or more monomers and/or crosslinkers can comprise initiating a radical reaction on the one or more monomers and/or crosslinkers. Resulting polymers from the polymerization may be crosslinked using any suitable methodology. Crosslinking refers to a procedure to connect units between neighboring chains of atoms in a complex chemical molecule (e.g., a polymer, a biopolymer such as a starch) and/or between molecules. The connecting can be in the form of any bond, for example, covalent bond, ionic bond, and the like.

In some embodiments, the method disclosed herein further comprises forming the crosslinked polymeric microgel into the form of dry powder. Forming the crosslinked polymeric microgel into the form of dry powder can use any suitable method (e.g., an oven, a grinder). In embodiments, the method further comprises sizing the crosslinked polymeric microgel by cutting and/or grinding the crosslinked polymeric microgel. In some embodiments, the crosslinked polymeric microgel is sized to any dimension compatible with a user and/or process goal, for example the crosslinked polymeric microgel may be converted from a cohesive gel into a powder.

In embodiments, the cementitious composition comprises a clay. The clay can comprise sepiolite, bentonite, sodium bentonite, montmorillonite, beidellite, nontronite, hectorite, samonite, smectite, kaolinite, serpentine, illite, chlorite, montmorillonite, saponite, fuller's earth, attapulgite, laponite, or combinations thereof. In some embodiments, the clay comprises sepiolite, bentonite, attapulgite, or combinations thereof. In one or more embodiments, the clay comprises sepiolite.

The clay can be present in the cementitious composition in an amount of from about 0.3 lb/bbl to about 15 lb/bbl based on the total volume of the cementitious composition, alternatively from about 0.5 lb/bbl to about 14 lb/bbl, or alternatively from about 0.8 lb/bbl to about 12 lb/bbl.

In embodiments, the weight ratio of the crosslinked polymeric microgel to the clay in the cementitious composition is from about 0.05 to about 5, alternatively from about 0.05 to about 4, or alternatively from about 0.1 to about 4. In embodiments, the weight ratio of the clay to the cementitious material in the cementitious composition is from about 0.5 to about 15, alternatively from about 1 to about 15, or alternatively from about 1 to about 12.

In embodiments, the cementitious composition comprises a cementitious material. The cementitious material can comprise calcium, aluminum, silicon, oxygen, iron, and/or sulfur. The cementitious material can comprise Portland cement, pozzolana cement, gypsum cement, shale cement, acid/base cement, phosphate cement, high alumina content cement, slag cement, silica cement, high alkalinity cement, magnesia cement, or combinations thereof. In embodiments, "high alumina content cement" refers to a cement having an alumina concentration in the range of from about 40 wt. % to about 80 wt. % by a weight of the high alumina content cement. In embodiments, "high alkalinity cement" refers to a cement having a sodium oxide concentration in the range of from about 1.0 wt. % to about 2.0 wt. % by a weight of the high alkalinity cement.

Portland cements that are suited for use in the disclosed cementitious composition include, but are not limited to, Class A, C, G, H, low sulfate resistant cements, medium sulfate resistant cements, high sulfate resistant cements, or combinations thereof. The class A, C, G, and H cements are classified according to API Specification 10. Additional examples of Portland cements suitable for use in the present disclose include, without limitation, those classified as ASTM Type I, II, III, IV, or V. In embodiments, the cementitious material comprises a Class G cement, a Class H cement, or a combination thereof.

The cementitious material can be present in the cementitious composition in an amount of from about 0.001 wt. % to about 85 wt. % based on the total weight of the cementitious composition, alternatively from about 0.01 wt. % to about 75 wt. %, alternatively from about 0.01 wt. % to about 50 wt. %, or alternatively from about 0.04 wt. % to about 25 wt. %.

The cementitious composition can comprise water. Generally, the water may be from any source, provided that it does not contain an amount of components that may undesirably affect the other components in the cementitious composition. For example, the water can be selected from a group consisting essentially of freshwater, seawater, saltwater, brine (e.g., underground natural brine, formulated brine, etc.), and combinations thereof. A formulated brine may be produced by dissolving one or more soluble salts in water, a natural brine, or seawater. Representative soluble salts include the chloride, bromide, acetate, and formate salts of potassium, sodium, calcium, magnesium, and zinc. The water can be present in the cementitious composition in an amount effective to provide a slurry having desired (e.g., job or service specific) rheological properties. In embodiments, the water is present in the cementitious composition in an amount of from about 10 gallons per barrel (gal/bbl) to about 50 gal/bbl based on the total volume of the cementitious composition, alternatively from about 15 gal/bbl to about 45 gal/bbl, or alternatively from about 20 gal/bbl to about 40 gal/bbl.

In embodiments, the cementitious composition further comprises a cement retarder, for example, to delay the setting and/or retard the cement. A broad variety of cement retarders may be suitable for use in the cementitious composition. For example, the cement retarder may comprise phosphonic acids, such as amino tris(methylene phosphonic acid), ethylenediamine tetra(methylene phosphonic acid), and diethylenetriamine penta(methylene phosphonic acid); lignosulfonates, such as sodium lignosulfonate and calcium lignosulfonate; salts such as stannous sulfate, lead acetate, monobasic calcium phosphate; organic acids, such as citric acid and tartaric acid; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or combinations thereof. Examples of cement retarders suitable for use in the present disclosure include, among others, phosphonic acid derivatives. One example of a cement retarder suitable for use in the present disclosure is Micro Matrix® cement retarder, available from Halliburton Energy Services, Inc.

Generally, the cement retarder can be present in the cementitious composition in an amount sufficient to delay the setting for a desired time. In some embodiments, the cement retarder is present in the cementitious composition in an amount of from about 0.5 lb/bbl to about 12 lb/bbl based on the total volume of the cementitious composition, alternatively from about 1 lb/bbl to about 10 lb/bbl, alternatively from about 1 lb/bbl to about 8 lb/bbl, or alternatively from about 1.5 lb/bbl to about 6 lb/bbl.

In embodiments, the cementitious composition further comprises a defoamer. The defoamer can comprise polyglycol; polyethylene glycol; polypropylene glycol; polytetrahydrofuran; polypropylene glycol on diatomaceous earth; a mixture of polypropylene glycol, olefin oil and hydrophobically modified silica; salts of sulfonated naphthalene-formaldehyde condensate; salts of sulfonated naphthalene-formaldehyde condensates combined with polyvinylpyrolidone; salts of sulfonated melamine-formaldehyde condensates; salts of polyether polycarboxylate; sulfonic-acid esters; carbohydrate esters; modified lignosulfonates; polyol silicone compounds; or combinations thereof. In embodiments, the defoamer is present in the cementitious composition in an amount of from about 0.5 lb/bbl to about 8 lb/bbl based on the total volume of the cementitious composition, alternatively from about 1 lb/bbl to about 7 lb/bbl, or alternatively from about 1.5 lb/bbl to about 6 lb/bbl.

In embodiments, the cementitious composition further comprises a dispersant. The dispersant can comprise sodium acid pyrophosphate (SAPP), ammonium lignosulfonate salt, metal lignosulfonate salts, phosphates, polyphosphates, organophosphates, phosphonates, tannins, leonardite, sulfonated naphthalene formaldehyde condensate, sulfonated acetone formaldehyde condensate, polyacrylates having a molecular weight less than about 10,000, or combinations thereof. An example of a dispersant suitable for use in this disclosure includes without limitation CFR-3™ dispersant, which is commercially available from Halliburton Energy Services, Inc.

The dispersant can be present in the cementitious composition in an amount of from about 0.5 lb/bbl to about 8 lb/bbl based on the total volume of the cementitious composition, alternatively from about 1 lb/bbl to about 7 lb/bbl, or alternatively from about 1.5 lb/bbl to about 6 lb/bbl.

In embodiments, the cementitious composition further comprises a weighting agent. A weighting agent can increase the density of the cementitious composition. Nonlimiting examples of suitable weighting agents for the present disclosure include barium sulfate (e.g., barite), iron oxide (e.g., hematite), manganese oxide (e.g., hausmannite), sand (e.g., silica sand), ilmenite, manganese tetraoxide, zinc oxide, zirconium oxide, fly ash, calcium carbonate, siderite, and combinations thereof. An example of weighting agents suitable for use in this disclosure includes without limitation a synthetic hausmannite known as MICROMAX® FF weight additive, which is commercially available from Elkem Materials Inc.

The amount of the weighting agent in the cementitious composition may be an amount effective to produce a desired density of the cementitious composition. In embodiments, the weighting agent is present in the cementitious composition in an amount of from about 0 lb/bbl to about 800 lb/bbl based on the total volume of the cementitious composition, alternatively from about 0 lb/bbl to about 750 lb/bbl, or alternatively from about 0 lb/bbl to about 700 lb/bbl.

In embodiments, the cementitious composition further comprises one or more additives. The one or more additives can comprise a strength-stabilizing agent, a friction reducer, an emulsifier, an expansion agent, a salt, a fluid loss agent, a vitrified shale, a thixotropic agent, a dispersing agent, a weight reducing additive (e.g., hollow glass or ceramic beads), a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives (i.e. carbon fibers, glass fibers, metal fibers, minerals fibers, polymeric elastomers, latexes, etc.), inert particulates, a biopolymer, a polymer, a fume silica, a free fluid control additive, particulate materials, viscosifiers, acids, bases, mutual solvents, corrosion inhibitors, conventional breaking agents, relative permeability modifiers, lime, gelling agents, crosslinking agents, weight-reducing agents, clay control agents, fluid loss control additives, flocculants, water softeners, foaming agents, proppants, salts, oxidation inhibitors, thinners, scavengers, gas scavengers, lubricants, bridging agents, a foam stabilizer, and the like, or combinations thereof.

In embodiments, the one or more additives are present in the cementitious composition in an amount of from about 0.01 gal/bbl to about 10 gal/bbl based on the total volume of the cementitious composition, alternatively from about 0.1 gal/bbl to about 8 gal/bbl, alternatively from about 0.1 gal/bbl to about 6 gal/bbl, or alternatively from about 0.1 gal/bbl to about 4 gal/bbl.

A cementitious composition of the type disclosed herein can be prepared using any suitable method. In embodiments, the method comprises dry mixing a first mixture. The first mixture can comprise more than one solid component (e.g., a cementitious material, a clay, a crosslinked polymeric microgel, and optionally a weighting agent) of the cementitious composition. In embodiments, the first mixture comprises a crosslinked polymeric microgel, a clay, and a cementitious material. Components of the first mixture can be added to a dry-mixing container (e.g., a mixing head of a solid feeding system) and be dry mixed therein. The dry-mixing container can be any container that is compatible with the components of the first mixture and has sufficient space for the components of the first mixture. A blender can be used for dry mixing.

In embodiments, the method further comprises placing the first mixture and water into a suitable container (e.g., a mixer, a blender) and blending to form a second mixture that is a pumpable slurry (e.g., a homogeneous fluid). The container can be any container that is compatible with the second mixture and has sufficient space for the second mixture. A blender or mixer can be used for blending/mixing the second mixture.

The cementitious composition can be prepared at the wellsite. For example, the components of the first mixture (e.g., the clay, the cementitious material, the crosslinked polymeric microgel, the one or more additives) can be transported to the wellsite and combined (e.g., mixed/ blended) with water located proximate the wellsite to form the cementitious composition. The water can be conveyed from a source to the wellsite or be available at the wellsite prior to the combining. The first mixture can be prepared at a location remote from the wellsite and transported to the wellsite, and, if necessary, stored at the on-site location. When it is desirable to prepare the cementitious composition on the wellsite, the components of the first mixture along with additional water and optional other additives can be added into a container (e.g. a blender tub, for example mounted on a trailer) to form a second mixture, and the second mixture is then blended until the second mixture becomes a pumpable slurry (e.g., a homogeneous fluid). Additives can be added to the cementitious composition during preparation thereof (e.g., during blending) and/or on-the-fly (e.g., in real time or on-location) by addition to (e.g., injection into) the cementitious composition when being pumped into the wellbore.

In some embodiments, the cementitious composition is used at temperature in a range of from about 50° F. to about 500° F., alternatively from about 50° F. to about 450° F., alternatively from about 50° F. to about 400° F., alternatively from about 50° F. to about 380° F., or alternatively from about 50° F. to about 360° F. The cementitious composition can be used in a wellbore having a Bottomhole Circulating Temperature (BHCT) from about 50° F. to about 500° F., alternatively from about 50° F. to about 450° F., alternatively from about 70° F. to about 450° F., alternatively from about 70° F. to about 400° F., alternatively from about 70° F. to about 380° F., or alternatively from about 70° F. to about 360° F. In embodiments, the cementitious composition is used in a wellbore having a Bottomhole Static Temperature (BHST) from about 50° F. to about 500° F., alternatively from about 70° F. to about 500° F., alternatively from about 70° F. to about 470° F., alternatively from about 100° F. to about 470° F., alternatively from about 100° F. to about 430° F., alternatively from about 100° F. to about 390° F. or, or alternatively from about 100° F. to about 360° F.

Plastic viscosity is the viscosity when extrapolated to infinite shear rate, e.g., the slope of the shear stress/shear rate line above yield point. The yield point refers to the resistance of a fluid to initial flow, or represents the stress required to start fluid movement. The cementitious composition disclosed herein can have any suitable plastic viscosity and yield point. At 80° F. to 500° F. and 40,000 psi the cementitious composition can have a plastic viscosity of from about 20 cP to about 400 cP, alternatively from about 20 cP to about 380 cP, or alternatively from about 20 cP to about 360 cP. At 80° F. to 500° F. and 40,000 psi the cementitious composition can have a yield point of from about 1 lbf/100 ft$^2$ to about 100 lbf/100 ft$^2$, alternatively from about 2 lbf/100 ft$^2$ to about 90 lbf/100 ft$^2$, alternatively from about 3 lbf/100 ft$^2$ to about 80 lbf/100 ft$^2$, or alternatively from about 5 lbf/100 ft$^2$ to about 70 lbf/100 ft$^2$. The Plastic viscosity and Yield point can be calculated using Bingham Plastic model.

In some embodiments, the cementitious composition has a density of from about 8.5 lb/gal (ppg) to about 22 ppg, alternatively from about 8.5 ppg to about 20 ppg, alternatively from about 9 ppg to about 18 ppg, or alternatively from about 11 ppg to about 18 ppg.

In embodiments, the cementitious composition has a mixability in a range of from about 3 to about 25 at about 80° F. and atmospheric pressure, alternatively from about 3 to about 20, alternatively from about 3 to about 15, alternatively from about 3 to about 10, or alternatively from about 3 to about 5. Measurement of the mixability can refer to a test standard API SPEC 10A.

In embodiments, the cementitious composition has a first rheology reading at a speed of from about 3 rpm to about 600 rpm a range of from about 3 to about 400 at about 180° F. and atmospheric pressure, alternatively from about 3 to about 350, alternatively from about 5 to about 300, alternatively from about 7 to about 280, alternatively from about 8 to about 250, or alternatively from about 10 to about 250, when measured in accordance with a test standard API-RP-10B-2.

In embodiments, after conditioning at from about 350° F. to about 375° F. for from about 30 min to about 60 min, the cementitious composition has a second rheology reading measured in accordance with test standard API-RP-10B-2. At about 180° F. and atmospheric pressure, and at a speed of from about 3 rpm to about 600 rpm, the second rheology reading can be in a range of from about 3 to about 400, alternatively from about 5 to about 350, alternatively from about 5 to about 300, alternatively from about 7 to about 300, alternatively from about 7 to about 250, alternatively from about 8 to about 200, alternatively from about 8 to about 180, or alternatively from about 8 to about 150, when measured in accordance with a test standard API-RP-10B-2.

In some embodiments, at a same rpm, a ratio of the second rheology reading to the first rheology reading is in a range of from about 4:10 to about 15:10, alternatively from about 6:10 to about 14:10, alternatively from about 6:10 to about 12:10, alternatively from about 7:10 to about 12:10, alternatively from about 7:10 to about 11:10, alternatively from about 8:10 to about 11:10.

In embodiments, after conditioning at from about 350° F. to about 375° F. for from about 30 min to about 60 min and curing, densities of a top part and a bottom part of the cementitious composition have a relative difference of equal to or less than about 20%, alternatively equal to or less than about 10%, alternatively equal to or less than about 5%, or alternatively equal to or less than about 2%. The curing can be at from about 350° F. to about 450° F. for from about 24 hours to about 72 hours. The measurement can be in accordance with test standard API-RP-10B. Herein the relative difference refers to the equations below:

relative difference=|density of a top part−density of a bottom part|/density of the top part or relative difference=|density of a top part−density of a bottom part|/density of the bottom part wherein |density of a top part−density of a bottom part| is the absolute value of the difference between the densities of a top part and a bottom part.

A cementitious composition of the type disclosed herein can be used as a cementitious fluid. A cementitious fluid refers to a material that can set and be used to permanently seal an annular space between casing and a wellbore wall. A cementitious fluid can also be used to seal formations to prevent loss of drilling fluid (e.g., in squeeze cementing operations) and for operations ranging from setting kick-off plugs to plug and abandonment of a wellbore. Generally, a cementitious fluid used in oil field is pumpable in relatively narrow annulus over long distances.

In embodiments, the cementitious composition is used in a subterranean workspace, for example in cementing underground pipe such as sewer pipe or wellbore casing. In embodiments, the cementitious composition is employed in primary cementing of a wellbore for the recovery of natural resources such as water or hydrocarbons. Primary cementing first involves drilling a wellbore to a desired depth such that the wellbore penetrates a subterranean formation while circulating a drilling fluid through the wellbore. Subsequent to drilling the wellbore, at least one conduit such as a casing may be placed in the wellbore while leaving a space known as the annulus (i.e., annular space) between the wall of the conduit and the wall of the wellbore. The drilling fluid may then be displaced down through the conduit and up through the annulus one or more times, for example, twice, to clean out the hole. The cementitious composition can then be conveyed (e.g., pumped) downhole and up through the annulus, thereby displacing the drilling fluid from the wellbore. In embodiments, the cementitious composition sets into a hard mass, which forms a cement column that isolates an adjacent portion of the subterranean formation and provides support to the adjacent conduit.

In some other embodiments, the cementitious composition is employed in a secondary cementing operation such as squeeze cementing, which is performed after the primary cementing operation. In squeeze cementing, the cementitious composition can be forced under pressure into permeable zones through which fluid can undesirably migrate in the wellbore. Examples of such permeable zones include fissures, cracks, fractures, streaks, flow channels, voids, high permeability streaks, annular voids, or combinations thereof. The permeable zones can be present in the cement column residing in the annulus, a wall of the conduit in the wellbore, a microannulus between the cement column and the subterranean formation, and/or a microannulus between the cement column and the conduit. The cementitious composition can set within the permeable zones, thereby forming a hard mass to plug those zones and prevent fluid from leaking therethrough.

Referring to the FIGURE, the cementitious composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24 of the wellbore 22. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 can also be disposed in the wellbore 22. As illustrated, there is a wellbore annulus (i.e., annular space) 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to the FIGURE, the cementitious composition 14 may be placed (e.g., pumped) down the interior of the casing 30. The cementitious composition 14 may be allowed to flow down the interior of the casing 30 through the casing shoe 42 at the bottom of the casing 30 and up around the casing 30 into the wellbore annulus 32. The cementitious composition 14 can be allowed to set in the wellbore annulus 32, for example, to form a cement sheath that supports and positions the casing 30 in the wellbore 22. Other techniques can also be utilized for introduction of the cementitious composition 14. By way of example, reverse circulation techniques may be used that includes introducing the cementitious composition 14 into the subterranean formation 20 by way of the wellbore annulus 32 instead of through the casing 30. In such embodiments, the method comprises circulating the cementitious composition 14 down through the wellbore annulus 32 and back up through the interior of the casing 30.

In embodiments, the cementitious composition 14 displaces other fluids 36, such as drilling fluids and/or spacer fluids that can be present in the interior of the casing 30 and/or the wellbore annulus 32. At least a portion of the displaced fluids 36 can exit the wellbore annulus 32 via a flow line and be deposited, for example, in one or more retention pits (e.g., a mud pit). A bottom plug 44 can be introduced into the wellbore 22 ahead of the cementitious composition 14, for example, to separate the cementitious composition 14 from the fluids 36 that can be inside the casing 30 prior to cementing. After the bottom plug 44 reaches the landing collar 46, a diaphragm or other suitable device can rupture to allow the cementitious composition 14 through the bottom plug 44. In the FIGURE, the bottom plug 44 is shown on the landing collar 46. In the illustrated embodiment, a top plug 48 may be introduced into the wellbore 22 behind the cementitious composition 14. The top plug 48 may separate the cementitious composition 14 from a displacement fluid 50 and also push the cementitious composition 14 through the bottom plug 44.

In embodiments, the method disclosed herein further comprises circulating the cementitious composition down through a conduit (e.g., casing) and back up through an annular space (also referred to as an annulus or a wellbore annulus) between an outside wall of the conduit and a wall of the wellbore. In some other embodiments, the method disclosed herein further comprises circulating the cementitious composition down through an annular space between an outside wall of a conduit and a wall of the wellbore and back up through the conduit. The method can further comprise allowing at least a portion of the cementitious composition to set.

Disclosed herein is a method of servicing a wellbore penetrating a subterranean formation. The method can comprise placing a cementitious composition into the wellbore, and allowing at least a portion of the cementitious composition to set. The cementitious composition can comprise a crosslinked polymeric microgel, a clay, a cementitious material, and water. In embodiments, the crosslinked polymeric microgel comprises a terpolymer of vinyl pyrrolidone, 2-acrylamido-2-methyl propane sulfonic acid (AMPS) and acrylamide, and the clay comprises sepiolite, bentonite, attapulgite, or combinations thereof.

Also disclosed herein is a method of servicing a wellbore with a conduit (e.g., casing, production tubing, tubular, or other mechanical conveyance, etc.) disposed therein to form an annular space between a wellbore wall and an outer surface of the conduit. In embodiments, the method comprises placing a cementitious composition into at least a portion of the annular space, and allowing at least a portion of the cementitious composition to set. The cementitious composition can comprise a crosslinked polymeric microgel, a clay, a cementitious material, and water. In embodiments, the crosslinked polymeric microgel comprises a terpolymer of vinyl pyrrolidone, 2-acrylamido-2-methyl propane sulfonic acid (AMPS) and acrylamide, and the clay comprises sepiolite, bentonite, attapulgite, or combinations thereof.

In the methods disclosed herein, placing a cementitious composition into at least a portion of the annular space can be in different directions. In some embodiments, placing the cementitious composition comprises circulating the cementitious composition down through the conduit and back up through the annular space. In some other embodiments, placing the cementitious composition comprises circulating the cementitious composition down through the annular space and back up through the conduit. In embodiments, the conduit comprises casing.

Various benefits may be realized by utilization of the presently disclosed methods and compositions. By incorporating into the cementitious composition the crosslinked polymeric microgel and the clay as disclosed herein, properties such as the rheology and suspension of the cementitious composition are suitable for use even at relatively high temperatures (e.g., 450° F.). A cementitious composition of the type disclosed herein can be utilized at temperatures in a range of from about 50° F. to about 500° F.

EXAMPLES

The embodiments having been generally described, the following examples are given as particular embodiments of the disclosure and to demonstrate the practice and advantages thereof. It is understood that the examples are given by way of illustration and are not intended to limit the specification or the claims in any manner.

Example 1

Six cement slurries with a density of 14 lb/gal were prepared per API procedures as Designs 1-6, and the composition of Designs 1-6 are listed in Table 1.

As shown in Table 1, Designs 1, 3, 5, and 6 included both a clay and a crosslinked polymeric microgel, Design 2 included a crosslinked polymeric microgel without a clay, and Design 4 included a clay without a crosslinked polymeric microgel. Three types of clays were used in the example: clay 1, clay 2, and clay 3. The clay 1 were in two forms with 98% purity and with 45% purity, respectively. Design 5 included clay 2 and Design 6 included clay 3. Except for the clay and the crosslinked polymeric microgel, the rest of the components in Designs 1-6 were of the same types and amounts. According to Table 1, Designs 1, 3, 5, and 6 were cement compositions of the type disclosed herein with different amounts and/or types of the clay. The total weight of the clay and the crosslinked polymeric microgel in Designs 1 and 3-6 were the same.

TABLE 1

| Different Slurry Designs | | | | | | |
|---|---|---|---|---|---|---|
| Component | Design 1 (g) | Design 2 (g) | Design 3 (g) | Design 4 (g) | Design 5 (g) | Design 6 (g) |
| Class G Cement | 424.7 | 424.7 | 424.7 | 424.7 | 424.7 | 424.7 |
| Strength-Stabilizing Agent-1 | 148.6 | 148.6 | 148.6 | 148.6 | 148.6 | 148.6 |
| Viscosifying agent | 21.2 | 21.2 | 21.2 | 21.2 | 21.2 | 21.2 |
| Defoamer | 1.1 | 1.1 | 1.1 | 1.1 | 1.1 | 1.1 |

TABLE 1-continued

Different Slurry Designs

| Component | Design 1 (g) | Design 2 (g) | Design 3 (g) | Design 4 (g) | Design 5 (g) | Design 6 (g) |
|---|---|---|---|---|---|---|
| Fluid Loss Agent | 8.4 | 8.4 | 8.4 | 8.4 | 8.4 | 8.4 |
| Cement Retarder 1 | 21.1 | 21.1 | 21.1 | 21.1 | 21.1 | 21.1 |
| Fresh Water | 368.7 | 368.7 | 368.7 | 368.7 | 368.7 | 368.7 |
| Clay 1 with 98% purity | 10.5 | — | — | 14 | — | — |
| Clay 1 with 45% purity | — | — | 10.5 | — | — | — |
| Clay 2 | — | — | — | — | 10.5 | — |
| Clay 3 | — | — | — | — | — | 10.5 |
| Crosslinked polymeric microgel | 3.5 | 3.5 | 3.5 | — | 3.5 | 3.5 |

The mixability was measured in a method based on API SPEC 10A. Designs 1-6 had similar mixability as shown in Table 2, The rheology of the four cement slurries of Designs 1-6 were measured by a FANN-35 rheometer at 180° F. and atmosphere in accordance with test standard API-RP-10B-2. Then the six cement slurries were conditioned in a high-pressure high-temperature (HPHT) consistometer at 356° F. for 30 minutes. After conditioning, the six cement slurries were cooled down to 180° F. and measured for rheology by a FANN-35 rheometer at 180° F. and atmosphere in accordance with test standard API-RP-10B-2. Referring to Table 2, both before and after conditioning, Designs 1, 3, 5, and 6 had rheology readings equal to or greater than 9, and greater than the rheology readings of Designs 2 and 4 at the same rpm. Before conditioning, Designs 1, 3, 5, and 6 had rheology readings greater than or similar as the sum of the rheology readings of Designs 2 and 4 at the same rpm. After conditioning, Designs 1, 3, 5, and 6 had rheology readings greater than the sum of the rheology readings of Designs 2 and 4 at the same rpm. Therefore, the combination of the crosslinked polymeric microgel and the clay in the cementitious compositions (Designs 1, 3, 5, and 6) resulted in synergistic effects in rheology. Even after conditioning at 356° F., the rheology readings of Designs 1, 3, 5, and 6 were greater than 120 at a relatively high rpm (e.g., 600 rpm). The results demonstrated that the combination of the crosslinked polymeric microgel and the clay in the cementitious compositions (Designs 1, 3, 5, and 6) yielded a rheology more suitable for mixing and applications (e.g., pumping) compared to Designs 2 and 4, especially after being exposed to relatively high temperatures.

TABLE 2

Results of rheology readings

| | Design 1 | Design 2 | Design 3 | Design 4 | Design 5 | Design 6 |
|---|---|---|---|---|---|---|
| Mixability | 4 | 5 | 4 | 5 | 4 | 3.5 |
| rpm | Rheology | | | | | |
| 3 | 11 | 2 | 10 | 4 | 9 | 12 |
| 6 | 15 | 3 | 14 | 6 | 11 | 15 |
| 30 | 32 | 8 | 28 | 10 | 18 | 31 |
| 60 | 45 | 12 | 41 | 13 | 26 | 46 |
| 100 | 61 | 17 | 54 | 18 | 34 | 61 |
| 200 | 93 | 30 | 83 | 28 | 55 | 92 |
| 300 | 120 | 42 | 109 | 38 | 74 | 120 |
| 600 | 178 | 74 | 160 | 64 | 123 | 185 |
| Rheology at 180° F. after conditioning at 356° F. for 30 min in HPHT Consistometer | | | | | | |
| 3 | 9 | 1 | 11 | 1 | 16 | 13 |
| 6 | 12 | 2 | 13 | 1 | 21 | 16 |
| 30 | 27 | 6 | 24 | 4 | 36 | 32 |
| 60 | 38 | 10 | 35 | 6 | 49 | 45 |
| 100 | 50 | 15 | 47 | 10 | 63 | 58 |
| 200 | 76 | 27 | 70 | 18 | 89 | 84 |
| 300 | 97 | 37 | 89 | 25 | 112 | 114 |
| 600 | 140 | 63 | 126 | 45 | 154 | 156 |

After the rheology measurements, the six cement slurries were poured into six separate settling test cylinders and cured for 48 hours at 356° F. and 3000 psi. After curing, the six cement slurries became set cement samples in the settling test cylinders. Each of the set cement samples were then cut into four equal parts, referred to as Top, Middle 1, Middle 2, and Bottom. The method was based on a test standard API-RP-10B. Densities of the four parts of each set cement sample were measured and shown in Table 3.

TABLE 3

Density results of settling tests

| | Design 1 | Design 2 | Design 3 | Design 4 | Design 5 | Design 6 |
|---|---|---|---|---|---|---|
| | Densities, lb/gal (ppg) | | | | | |
| Top | 14.12 | 11.3 | 13.96 | 10.92 | 14.2 | 14.04 |
| Middle 1 | 14.18 | 13.28 | 14.15 | 13.89 | 14.3 | 14.05 |
| Middle 2 | 14.15 | 14.36 | 14.2 | 15.66 | 14.32 | 14.06 |
| Bottom | 14.31 | 16.45 | 14.21 | 17.52 | 14.48 | 14.14 |

According to Table 3, with both the clay and the crosslinked polymeric microgel, Designs 1, 3, 5, and 6 showed differences of 0.19 ppg, 0.25 ppg, 0.28 ppg, and 0.10 ppg in density between the top part and the bottom part, respectively. For Designs 1, 3, 5, and 6, the relative differences in density between the top part and the bottom part were within 2%, respectively. With either the crosslinked polymeric microgel or the clay, Designs 2 and 4 had differences of greater than 4 ppg in density between the top part and the bottom part, which was about 30% to about 40% relative difference. Thus Designs 1, 3, 5, and 6 displayed a smaller density difference and/or relative difference than Design 2 or Design 4, and a smaller density difference and/or relative difference than the sum of density differences and/or relative differences of Designs 2 and 4, demonstrating that combination of the crosslinked polymeric microgel and the clay in the cementitious compositions (Designs 1, 3, 5, and 6) resulted in synergistic effects in density difference in settling tests. For Designs 1, 3, 5, and 6, even with low differences and/or relative differences in density, the slurry viscosity both at mixing and after conditioning were reasonably low, indicating suitable mixing and pumping of the slurry.

Example 2

Similar experiments were carried out for two cement slurries with a density of 19 lb/gal prepared per API procedures and labeled Designs 7 and 8. The composition of Designs 7 and 8 are listed in Table 4.

As shown in Table 4, Design 8 included both a clay and a crosslinked polymeric microgel, and Design 7 did not include a crosslinked polymeric microgel or a clay. Except for the clay and the crosslinked polymeric microgel, the rest of the components in Designs 7-8 were of the same types and amounts.

TABLE 4

Different Slurry Designs

| Component | Design 7 (g) | Design 8 (g) |
|---|---|---|
| Class H Cement | 510.5 | 510.5 |
| Strength-Stabilizing Agent 1 | 51 | 51 |
| Strength-Stabilizing Agent 2 | 153.1 | 153.1 |
| Weighting Agent | 347.1 | 347.1 |
| Fluid Loss Agent | 3.1 | 3.1 |
| Dispersant | 4.6 | 4.6 |
| Expanding Additive | 5.1 | 5.1 |
| Cement Retarder 2 | 6.6 | 6.6 |
| Cement Retarder 3 | 6.6 | 6.6 |
| Defoamer | 0.8 | 0.8 |
| Fresh Water | 269.1 | 269.1 |
| Clay 1 with 98% purity | — | 6 |
| Crosslinked polymeric microgel | — | 2 |

The two cement slurries of Designs 7 and 8 were measured for the mixability and rheology before and after conditioning using the same method as Example 1, except that the conditioning was at 359° F. Referring to Table 5, Designs 7-8 had similar mixability. Both before and after conditioning, Design 8 had rheology readings equal to or greater than 13, and greater than the rheology readings of Design 7 at the same rpm. Even after conditioning at 359° F., the rheology reading of Design 8 was greater than 200 at a relatively high rpm (e.g., 300 rpm). The results demonstrated that combination of the crosslinked polymeric microgel and the clay in the cementitious compositions (Design 8) yielded a rheology more suitable for mixing and applications (e.g., pumping) compared to Design 7, especially after being exposed to relatively high temperatures.

TABLE 5

Results of rheology readings

| Mixability rpm | Design 7<br>4 | Design 8<br>3 |
|---|---|---|
| | Rheology | |
| 3 | 3 | 21 |
| 6 | 5 | 26 |
| 30 | 14 | 58 |
| 60 | 20 | 85 |
| 100 | 30 | 118 |
| 200 | 51 | 187 |
| 300 | 72 | 249 |

Rheology at 180° F. after conditioning at 359° F. for 30 min in HPHT Consistometer

| 3 | 2 | 13 |
| 6 | 3 | 19 |

TABLE 5-continued

Results of rheology readings

| Mixability rpm | Design 7<br>4 | Design 8<br>3 |
|---|---|---|
| | Rheology | |
| 30 | 6 | 44 |
| 60 | 10 | 70 |
| 100 | 15 | 98 |
| 200 | 28 | 158 |
| 300 | 42 | 210 |

After the rheology measurements, the two cement slurries were poured into two separate settling test cylinders and cured for 48 hours at 440° F. and 3000 psi. After curing, the two cement slurries set and were cut into four equal parts. Densities of the four parts of each set cement sample were measured and the results are shown in Table 6.

TABLE 6

Density results of settling tests

| | Design 7 | Design 8 |
|---|---|---|
| | Densities, lb/gal (ppg) | |
| Top | 17.02 | 18.90 |
| Middle 1 | 18.50 | 19.02 |
| Middle 2 | 20.27 | 19.06 |
| Bottom | 21.39 | 19.11 |

Referring to Table 6, with both the clay and the crosslinked polymeric microgel, Design 8 showed a difference of 0.21 ppg in density between the top part and the bottom part, and relative differences in density between the top part and the bottom part of within 2%. With neither crosslinked polymeric microgel nor clay, Design 7 had differences of greater than 4 ppg in density between the top part and the bottom part, which was about 25% to about 30% relative difference. Thus, Design 8 had a smaller density difference and/or relative difference across the cement than Design 7. For Design 8, even with low differences and/or relative difference in density, the slurry viscosity both at mixing and after conditioning were reasonably low, indicating suitable mixing and pumping of the slurry.

Additional Disclosure

The following is provided as additional disclosure for combinations of features and embodiments of the present disclosure.

A first embodiment, which is a method of servicing a wellbore penetrating a subterranean formation, comprising: placing a cementitious composition into the wellbore, wherein the cementitious composition comprises a crosslinked polymeric microgel, a clay, a cementitious material, and water.

A second embodiment, which is the method of the first embodiment, wherein the crosslinked polymeric microgel is a crosslinked polymer.

A third embodiment, which is the method of the first or the second embodiment, wherein the crosslinked polymeric microgel comprises monomer units selected from vinyl pyrrolidone, 2-Acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-Dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3 (E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutraldchyde glutaraldehyde, acryloylmorpholine, and any combination thereof.

A fourth embodiment, which is the method of any of the first through the third embodiments, wherein the crosslinked polymeric microgel comprises monomer units of vinyl pyrrolidone, 2-Acrylamido-2-methyl propane sulfonic acid (AMPS), and acrylamide.

A fifth embodiment, which is the method of the fourth embodiment, wherein the vinyl pyrrolidone monomer units are in the crosslinked polymeric microgel in an amount of from about 5 mol % to about 30 mol % based on the total moles of monomer units in a molecule of the crosslinked polymeric microgel, wherein the AMPS monomer units are in the crosslinked polymeric microgel in an amount of from about 40 mol % to about 90 mol % based on the total moles of monomer units in the molecule of the crosslinked polymeric microgel, and wherein the acrylamide monomer units are in the crosslinked polymeric microgel in an amount of from about 5 mol % to about 50 mol % based on the total moles of monomer units in the molecule of the crosslinked polymeric microgel.

A sixth embodiment, which is the method of the fourth embodiment or the fifth embodiment, wherein the molar ratio of the AMPS monomer units to the vinyl pyrrolidone monomer units is from about 10 to about 0.1, and wherein the molar ratio of the acrylamide monomer units to the vinyl pyrrolidone monomer units is from about 10 to about 0.1.

A seventh embodiment, which is the method of any of the first through the sixth embodiments, wherein the crosslinked polymeric microgel is present in the cementitious composition in an amount of from about 0.1 lb/bbl to about 5 lb/bbl based on the total volume of the cementitious composition.

An eighth embodiment, which is the method of any of the first through the seventh embodiments, wherein the weight ratio of the crosslinked polymeric microgel to the cementitious material in the cementitious composition is from about 0.5 to about 0.01.

A ninth embodiment, which is the method of any of the first through the eighth embodiments, wherein the clay comprises sepiolite, bentonite, sodium bentonite, montmorillonite, beidellite, nontronite, hectorite, samonite, smectite, kaolinite, serpentine, illite, chlorite, montmorillonite, saponite, fuller's earth, attapulgite, laponite, or combinations thereof.

A tenth embodiment, which is the method of any of the first through the ninth embodiments, wherein the clay comprises sepiolite, bentonite, attapulgite, or combinations thereof.

An eleventh embodiment, which is the method of any of the first through the tenth embodiments, wherein the clay is present in the cementitious composition in an amount of from about 0.3 lb/bbl to about 15 lb/bbl based on the total volume of the cementitious composition.

A twelfth embodiment, which is the method of any of the first through the eleventh embodiments, wherein the weight ratio of the crosslinked polymeric microgel to the clay in the cementitious composition is from about 0.05 to about 5.

A thirteenth embodiment, which is the method of any of the first through the twelfth embodiments, wherein the weight ratio of the clay to the cementitious material in the cementitious composition is from about 0.5 to about 15.

A fourteenth embodiment, which is the method of any of the first through the thirteenth embodiments, wherein the cementitious material comprises Portland cement, pozzolana cement, gypsum cement, shale cement, acid/base cement, phosphate cement, high alumina content cement, slag cement, silica cement, high alkalinity cement, magnesia cement, or combinations thereof.

A fifteenth embodiment, which is the method of any of the first through the fourteenth embodiments, wherein the cementitious material comprises a Class G cement, a Class H cement, or a combination thereof.

A sixteenth embodiment, which is the method of any of the first through the fifteenth embodiments, wherein the cementitious material is present in the cementitious composition in an amount of from about 0.001 wt. % to about 85 wt. % based on the total weight of the cementitious composition.

A seventeenth embodiment, which is the method of any of the first through the sixteenth embodiments, wherein the water comprises water selected from the group consisting of freshwater, saltwater, brine, seawater, and any combination thereof.

An eighteenth embodiment, which is the method of any of the first through the seventeenth embodiments, wherein the water is present in the cementitious composition in an amount of from about 10 gallons per barrel (gal/bbl) to about 50 gal/bbl based on the total volume of the cementitious composition.

A nineteenth embodiment, which is the method of any of the first through the eighteenth embodiments, wherein the cementitious composition further comprises a cement retarder.

A twentieth embodiment, which is the method of the nineteenth embodiment, wherein the cement retarder comprises a phosphonic acid, a phosphonic acid derivative, a lignosulfonate, a salt, an organic acid, a carboxymethylated hydroxyethylated cellulose, a synthetic co- or ter-polymer comprising sulfonate and carboxylic acid groups, a borate compound, derivatives thereof, or combinations thereof.

A twenty-first embodiment, which is the method of any of the nineteenth and the twentieth embodiments, wherein the cement retarder is present in the cementitious composition in an amount of from about 0.5 lb/bbl to about 12 lb/bbl based on the total volume of the cementitious composition.

A twenty-second embodiment, which is the method of any of the first through the twenty-first embodiments, wherein the cementitious composition further comprises a defoamer.

A twenty-third embodiment, which is the method of the twenty-second embodiment, wherein the defoamer comprises polyglycol; polyethylene glycol; polypropylene glycol; polytetrahydrofuran; polypropylene glycol on diatomaceous earth; a mixture of polypropylene glycol, olefin oil and hydrophobically modified silica; salts of sulfonated naphthalene-formaldehyde condensate; salts of sulfonated naphthalene-formaldehyde condensates combined with polyvinylpyrolidone; salts of sulfonated melamine-formaldehyde condensates; salts of polyether polycarboxylate;

sulfonic-acid esters; carbohydrate esters; modified lignosulfonates; polyol silicone compounds; or combinations thereof.

A twenty-fourth embodiment, which is the method of any of the twenty-second and the twenty-third embodiments, wherein the defoamer is present in the cementitious composition in an amount of from about 0.5 lb/bbl to about 8 lb/bbl based on the total volume of the cementitious composition.

A twenty-fifth embodiment, which is the method of any of the first through the twenty-fourth embodiments, wherein the cementitious composition further comprises a dispersant.

A twenty-sixth embodiment, which is the method of the twenty-fifth embodiment, wherein the dispersant comprises sodium acid pyrophosphate (SAPP), ammonium lignosulfonate salt, metal lignosulfonate salts, phosphates, polyphosphates, organophosphates, phosphonates, tannins, leonardite, sulfonated naphthalene formaldehyde condensate, sulfonated acetone formaldehyde condensate, polyacrylates having a molecular weight less than about 10,000, or combinations thereof.

A twenty-seventh embodiment, which is the method of any of the twenty-fifth and the twenty-sixth embodiments, wherein the dispersant is present in the cementitious composition in an amount of from about 0.5 lb/bbl to about 8 lb/bbl based on the total volume of the cementitious composition.

A twenty-eighth embodiment, which is the method of any of the first through the twenty-seventh embodiments, wherein the cementitious composition further comprises a weighting agent.

A twenty-ninth embodiment, which is the method of the twenty-eighth embodiment, wherein the weighting agent comprises barium sulfate, iron oxide, manganese oxide, sand, ilmenite, manganese tetraoxide, zinc oxide, zirconium oxide, fly ash, calcium carbonate, siderite, or combinations thereof.

A thirtieth embodiment, which is the method of any of the twenty-eighth and the twenty-ninth embodiments, wherein the weighting agent is present in the cementitious composition in an amount of from about 0 lb/bbl to about 800 lb/bbl based on the total volume of the cementitious composition.

A thirty-first embodiment, which is the method of any of the first through the thirtieth embodiments, wherein the cementitious composition further comprises one or more additives.

A thirty-second embodiment, which is the method of the thirty-first embodiment, wherein the one or more additives comprise a strength-stabilizing agent, a friction reducer, an emulsifier, an expansion agent, a salt, a fluid loss agent, a vitrified shale, a thixotropic agent, a dispersing agent, a weight reducing additive, a heavyweight additive, a surfactant, a scale inhibitor, a clay stabilizer, a silicate-control agent, a biocide, a biostatic agent, a storage stabilizer, a filtration control additive, a suspending agent, a foaming surfactant, latex emulsions, a formation conditioning agent, elastomers, gas/fluid absorbing materials, resins, viscosifying agents, superabsorbers, mechanical property modifying additives, inert particulates, a biopolymer, a polymer, a fume silica, a free fluid control additive, particulate materials, viscosifiers, acids, bases, mutual solvents, corrosion inhibitors, conventional breaking agents, relative permeability modifiers, lime, gelling agents, crosslinking agents, weight-reducing agents, clay control agents, fluid loss control additives, flocculants, water softeners, foaming agents, proppants, salts, oxidation inhibitors, thinners, scavengers, gas scavengers, lubricants, bridging agents, a foam stabilizer, and the like, or combinations thereof.

A thirty-third embodiment, which is the method of any of the thirty-first and the thirty-second embodiments, wherein the one or more additives are present in the cementitious composition in an amount of from about 0.01 gal/bbl to about 10 gal/bbl based on the total volume of the cementitious composition.

A thirty-fourth embodiment, which is the method of any of the first through the thirty-third embodiments, wherein the crosslinked polymeric microgel comprises monomer units of vinyl pyrrolidone, 2-Acrylamido-2-methyl propane sulfonic acid (AMPS), and acrylamide, and wherein the clay comprises sepiolite, bentonite, attapulgite, or combinations thereof.

A thirty-fifth embodiment, which is the method of any of the first through the thirty-fourth embodiments, wherein the wellbore has a Bottomhole Circulating Temperature (BHCT) of from about 50° F. to about 500° F.

A thirty-sixth embodiment, which is the method of any of the first through the thirty-fifth embodiments, wherein the wellbore has a Bottomhole Static Temperature (BHST) of from about 50° F. to about 500° F.

A thirty-seventh embodiment, which is the method of any of the first through the thirty-sixth embodiments, wherein at 80° F. to 500° F. and 40,000 psi the cementitious composition has a plastic viscosity of from about 20 cP to about 400 cP.

A thirty-eighth embodiment, which is the method of any of the first through the thirty-seventh embodiments, wherein at 80° F. to 500° F. and 40,000 psi the cementitious composition has a yield point of from about 1 lbf/100 ft$^2$ to about 100 lbf/100 ft$^2$.

A thirty-ninth embodiment, which is the method of any of the first through the thirty-eighth embodiments, wherein the cementitious composition has a density of from about 8.5 lb/gal to about 22 lb/gal.

A fortieth embodiment, which is the method of any of the first through the thirty-ninth embodiments, wherein at 180° F. and atmospheric pressure, and 3 rpm to 600 rpm, the cementitious composition has a first rheology reading in a range of from about 3 to about 400 when measured in accordance with test standard API-RP-10B-2; and wherein after conditioning at from about 350° F. to about 375° F. for from about 30 min to about 60 min, at 180° F. and atmospheric pressure, and 3 rpm to 600 rpm, the cementitious composition has a second rheology reading in a range of from about 3 to about 400 when measured in accordance with test standard API-RP-10B-2.

A forty-first embodiment, which is the method of the fortieth embodiment, wherein a ratio of the second rheology reading to the first rheology reading is in a range of from about 4:10 to about 15:10 at a same rpm.

A forty-second embodiment, which is the method of any of the first through the forty-first embodiments, wherein after conditioning at from about 350° F. to about 375° F. for from about 30 min to about 60 min and curing, densities of a top part and a bottom part of the cementitious composition have a relative difference of equal to or less than about 20%, when measured in accordance with test standard API-RP-10B.

A forty-third embodiment, which is a method of preparing a crosslinked polymeric microgel, comprising: polymerizing one or more monomers and/or crosslinkers selected from vinyl pyrrolidone, 2-Acrylamido-2-methyl propane sulfonic acid (AMPS), acrylamide, N,N-dimethylacrylamide (NNDMA), N-vinylacetamide, allyloxy-2-hydroxy propane sulfonic acid (AHPS), acrylic acid (AA), 2-acrylamido-2-tert.-butyl sulfonic acid (ATBS), N,N-Dimethylaniline, pentaerythritol allyl ether, methylenebisacrylamide, divinyl ether, diallyl ether, vinyl or allyl ethers of polyglycols or polyols, divinylbenzene, 1,3-divinylimidazolidin-2-one, divinyltetrahydropyrimidin-2(1H)-one, dienes, allyl amines, N-vinyl-3(E)-ethylidene pyrrolidone, ethylidene bis(N-vinylpyrrolidone), N-substituted acrylamides, methacrylamide, N-substituted methacrylamides, acrylates, methacrylates, methacrylic acid, N-vinylamides, N-allyl amides, vinyl alcohol, vinyl ethers, vinyl esters, allyl alcohol, allyl ethers, allyl esters, vinylpyridine, vinyl sulfonates, allyl sulfonates, vinylimidazole, allylimidazole, diallyldimethylammonium chloride, epichlorohydrin, epichhalohydrin, diepoxides, dialdehydes, trimethyolpropane triacrylate, pentaerythritol tetraacrylate, divinyl sulphone, carbodiimide, glutraldchyde glutaraldehyde, and any combination thereof.

A forty-fourth embodiment, which is the method of the forty-third embodiment, wherein the one or more monomers and/or crosslinkers are vinyl pyrrolidone, 2-Acrylamido-2-methyl propane sulfonic acid (AMPS), and acrylamide.

A forty-fifth embodiment, which is the method of any of the forty-third and the forty-fourth embodiments, wherein the polymerizing comprises initiating a radical reaction on the one or more monomers and/or crosslinkers.

A forty-sixth embodiment, which is the method of any of the forty-third through the forty-fifth embodiments, further comprising forming the crosslinked polymeric microgel in a form of dry powder.

A forty-seventh embodiment, which is a method of preparing a cementitious composition, comprising: dry mixing a first mixture comprising a crosslinked polymeric microgel, a clay, and a cementitious material; placing a second mixture of the first mixture and water into a container; and blending the second mixture until the second mixture becomes a pumpable slurry.

A forty-eighth embodiment, which is the method of any of the first through the forty-second embodiments, further comprising circulating the cementitious composition down through a conduit and back up through an annular space between an outside wall of the conduit and a wall of the wellbore.

A forty-ninth embodiment, which is the method of any of the first through the forty-second embodiments, further comprising circulating the cementitious composition down through an annular space between an outside wall of a conduit and a wall of the wellbore and back up through the conduit.

A fiftieth embodiment, which is the method of any of the first through the forty-ninth embodiments, further comprising allowing at least a portion of the cementitious composition to set.

A fifty-first embodiment, which is a method of servicing a wellbore penetrating a subterranean formation, comprising: placing a cementitious composition into the wellbore, wherein the cementitious composition comprises a crosslinked polymeric microgel, a clay, a cementitious material, and water, wherein the crosslinked polymeric microgel comprises monomer units of vinyl pyrrolidone, 2-Acrylamido-2-methyl propane sulfonic acid (AMPS) and acrylamide, and wherein the clay comprises sepiolite, bentonite, attapulgite, or combinations thereof, and allowing at least a portion of the cementitious composition to set.

A fifty-second embodiment, which is a method of servicing a wellbore with a conduit disposed therein to form an annular space between a wellbore wall and an outer surface of the conduit, comprising: placing a cementitious composition into at least a portion of the annular space, wherein the cementitious composition comprises a crosslinked polymeric microgel, a clay, a cementitious material, and water, wherein the crosslinked polymeric microgel comprises monomer units of vinyl pyrrolidone, 2-Acrylamido-2-methyl propane sulfonic acid (AMPS) and acrylamide, and wherein the clay comprises sepiolite, bentonite, attapulgite, or combinations thereof, and allowing at least a portion of the cementitious composition to set.

A fifty-third embodiment, which is the method of the fifty-second embodiment, wherein placing a cementitious composition into at least a portion of the annular space comprises: circulating the cementitious composition down through the conduit and back up through the annular space.

A fifty-fourth embodiment, which is the method of the fifty-second embodiment, wherein placing a cementitious composition into at least a portion of the annular space comprises: circulating the cementitious composition down through the annular space and back up through the conduit.

A fifty-fifth embodiment, which is the method of any of the fifty-second through the fifty-fourth embodiments, wherein the conduit comprises casing.

While embodiments of the disclosure have been shown and described, modifications thereof can be made by one skilled in the art without departing from the spirit and teachings of the disclosure. The embodiments described herein are exemplary only, and are not intended to be limiting. Many variations and modifications of the disclosure disclosed herein are possible and are within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_L$, and an upper limit, $R_U$, is disclosed, any number falling within the range is specifically disclosed. In particular, the following numbers within the range are specifically disclosed: $R=R_L+k*(R_U-R_L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. When a feature is described as "optional," both embodiments with this feature and embodiments without this feature are disclosed. Similarly, the present disclosure contemplates embodiments where this feature is required and embodiments where this feature is specifically excluded. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the embodiments of the present disclosure.

What is claimed is:

1. A method of servicing a wellbore penetrating a subterranean formation, comprising: placing a cementitious composition into the wellbore,
   wherein the cementitious composition comprises a crosslinked polymeric microgel, a clay, a cementitious material, and water,
   wherein the crosslinked polymeric microgel comprises monomer units of vinyl pyrrolidone, 2-Acrylamido-2-methyl propane sulfonic acid (AMPS), and acrylamide, and
   wherein the vinyl pyrrolidone monomer units are in the crosslinked polymeric microgel in an amount of from about 5 mol % to about 30 mol % based on the total moles of monomer units in a molecule of the crosslinked polymeric microgel, the AMPS monomer units are in the crosslinked polymeric microgel in an amount of from about 40 mol % to about 90 mol % based on the total moles of monomer units in the molecule of the crosslinked polymeric microgel, and the acrylamide monomer units are in the crosslinked polymeric microgel in an amount of from about 5 mol % to about 50 mol % based on the total moles of monomer units in the molecule of the crosslinked polymeric microgel.

2. The method of claim 1, wherein the crosslinked polymeric microgel is a crosslinked polymer.

3. The method of claim 1, wherein the molar ratio of the AMPS monomer units to the vinyl pyrrolidone monomer units is from about 10 to about 0.1, and wherein the molar ratio of the acrylamide monomer units to the vinyl pyrrolidone monomer units is from about 10 to about 0.1.

4. The method of claim 1, wherein the crosslinked polymeric microgel is present in the cementitious composition in an amount of from about 0.1 lb/bbl to about 5 lb/bbl based on the total volume of the cementitious composition.

5. The method of claim 1, wherein the clay comprises sepiolite, bentonite, sodium bentonite, montmorillonite, beidellite, nontronite, hectorite, samonite, smectite, kaolinite, serpentine, illite, chlorite, saponite, fuller's earth, attapulgite, laponite, or combinations thereof.

6. The method of claim 1, wherein the clay is present in the cementitious composition in an amount of from about 0.3 lb/bbl to about 15 lb/bbl based on the total volume of the cementitious composition.

7. The method of claim 1, wherein the weight ratio of the crosslinked polymeric microgel to the clay in the cementitious composition is from about 0.05 to about 5.

8. The method of claim 1, wherein the cementitious material is present in the cementitious composition in an amount of from about 0.001 wt. % to about 85 wt. % based on the total weight of the cementitious composition.

9. The method of claim 1, wherein the clay comprises sepiolite, bentonite, attapulgite, or combinations thereof.

10. The method of claim 1, wherein the wellbore has a Bottomhole Static Temperature (BHST) of from about 50° F. to about 500° F.

11. The method of claim 1, wherein at 180° F. and atmospheric pressure, and 3 rpm to 600 rpm, the cementitious composition has a first rheology reading in a range of from about 3 to about 400 when measured in accordance with test standard API-RP-10B-2; and wherein after conditioning with a consistometer at from about 350° F. to about 375° F. for from about 30 min to about 60 min, at 180° F. and atmospheric pressure, and 3 rpm to 600 rpm, the cementitious composition has a second rheology reading in a range of from about 3 to about 400 when measured in accordance with test standard API-RP-10B-2.

12. The method of claim 11, wherein a ratio of the second rheology reading to the first rheology reading is in a range of from about 4:10 to about 15:10 at a same rpm.

13. The method of claim 1, wherein after conditioning with a consistometer at from about 350° F. to about 375° F. for from about 30 min to about 60 min and curing, densities of a top part and a bottom part of the cementitious composition have a relative difference of equal to or less than about 20%, when measured in accordance with test standard API-RP-10B.

14. The method of claim 1, further comprising circulating the cementitious composition down through a conduit and back up through an annular space between an outside wall of the conduit and a wall of the wellbore.

15. The method of claim 1, further comprising circulating the cementitious composition down through an annular space between an outside wall of a conduit and a wall of the wellbore and back up through the conduit.

16. The method of claim 1, further comprising allowing at least a portion of the cementitious composition to set.

17. The method of claim 1, wherein the molar ratio of the AMPS monomer units to the vinyl pyrrolidone monomer units is from about 5 to about 1, and wherein the molar ratio of the acrylamide monomer units to the vinyl pyrrolidone monomer units is from about 5 to about 1.

18. A method of servicing a wellbore penetrating a subterranean formation, comprising: placing a cementitious composition into the wellbore,
   wherein the cementitious composition comprises a crosslinked polymeric microgel, a clay, a cementitious material, and water,
   wherein the crosslinked polymeric microgel comprises monomer units of vinyl pyrrolidone, 2-Acrylamido-2-methyl propane sulfonic acid (AMPS) and acrylamide, and wherein the clay comprises sepiolite, bentonite, attapulgite, or combinations thereof, and
   wherein the vinyl pyrrolidone monomer units are in the crosslinked polymeric microgel in an amount of from about 5 mol % to about 30 mol % based on the total moles of monomer units in a molecule of the crosslinked polymeric microgel, wherein the AMPS monomer units are in the crosslinked polymeric microgel in an amount of from about 40 mol % to about 90 mol % based on the total moles of monomer units in the molecule of the crosslinked polymeric microgel, and wherein the acrylamide monomer units are in the crosslinked polymeric microgel in an amount of from about 5 mol % to about 50 mol % based on the total moles of monomer units in the molecule of the crosslinked polymeric microgel, and
   allowing at least a portion of the cementitious composition to set.

19. The method of claim 18, wherein the molar ratio of the AMPS monomer units to the vinyl pyrrolidone monomer units is from about 10 to about 0.1, and wherein the molar ratio of the acrylamide monomer units to the vinyl pyrrolidone monomer units is from about 10 to about 0.1.

20. The method of claim 18, wherein the molar ratio of the AMPS monomer units to the vinyl pyrrolidone monomer units is from about 5 to about 1, and wherein the molar ratio of the acrylamide monomer units to the vinyl pyrrolidone monomer units is from about 5 to about 1.

* * * * *